Aug. 4, 1925.
L. LORENZEN
SELF ALIGNING BEARING CONNECTION
Filed Oct. 29, 1924
1,548,148
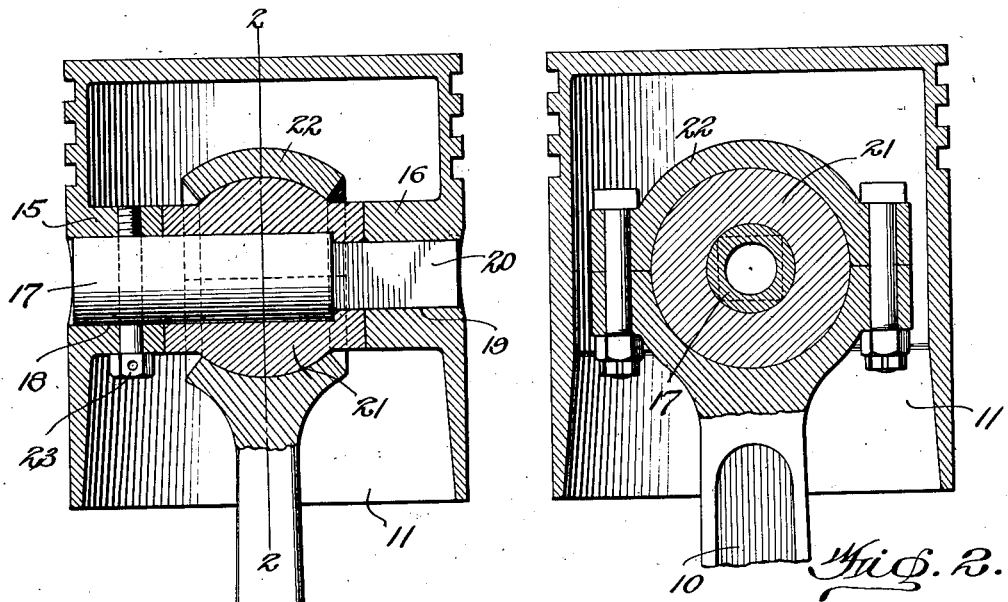
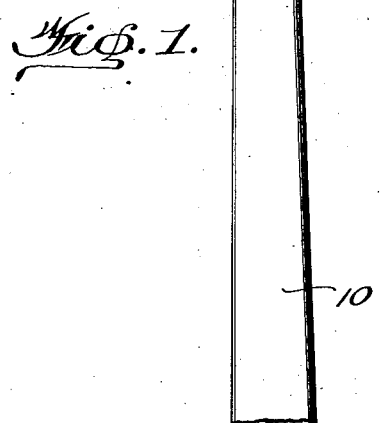
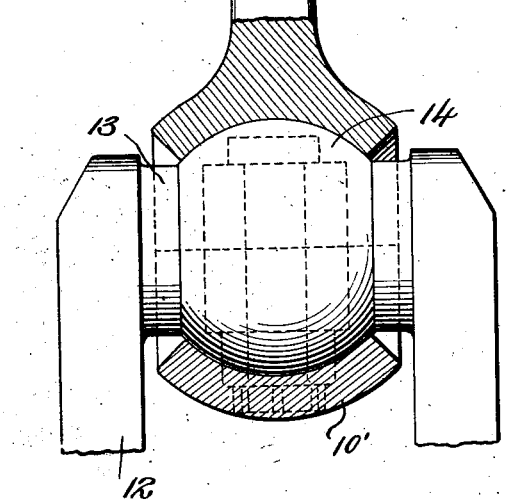
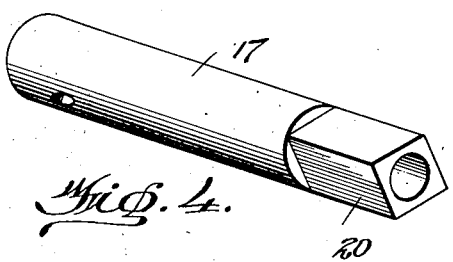
Inventor
Lorenz Lorenzen,
by Bright & Bailey
Attorneys Patented Aug. 4, 1925.

1,548,148

UNITED STATES PATENT OFFICE.

LORENZ LORENZEN, OF SALT LAKE CITY, UTAH.

SELF-ALIGNING BEARING CONNECTION.

Application filed October 29, 1924. Serial No. 746,647.

*To all whom it may concern:*

Be it known that I, LORENZ LORENZEN, a citizen of the United States, and resident of Salt Lake City, in the county of Salt Lake and State of Utah, have invented certain new and useful Improvements in Self-Aligning Bearing Connections, of which the following is a specification.

My invention relates to improvements in self-aligning bearing connections between a connecting rod and a crank shaft and piston, my purpose being to provide a simple, cheap and efficient construction whereby harmful stresses and strains in and upon such parts are eliminated and all forces transmitted between them are concentrated substantially in a direct line, so that friction with consequent wear, looseness of parts and the necessity for their frequent adjustment is reduced to a minimum.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views Figure 1 is a sectional view showing my improved bearing connections between a connecting rod and a crank shaft and piston;

Figure 2, a transverse section on the line 2—2 of Figure 1;

Figure 3, a sectional view through the ball member constituting an element of the bearing connection between the piston and the connecting rod; and Figure 4, a perspective of the wrist pin shown in Figures 1 and 2.

In the present instance I have shown my improved bearing connections associated with a connecting rod 10 between a conventional piston 11 and crank shaft 12.

The crank pin 13 of crank shaft 12 is provided with a spherical enlargement 14, while the adjacent end of the connecting rod 10 and its bearing half 10' are correspondingly provided with spherical recesses, so that when the bearing half is bolted to the connecting rod in conventional manner in enclosing relation to the spherical enlargement 14 a ball and socket joint is produced between the crank pin and the connecting rod as is obvious.

Piston 11 is provided with internal transversely aligned bosses 15 and 16 for supporting a wrist pin 17, boss 15 in this instance being formed with a circular opening 18 and boss 16 with a square or other polygonally shaped opening 19 to receive a correspondingly shaped end 20 of the wrist pin whereby the latter is prevented from turning within the openings in said bosses as is manifest.

On the wrist pin is mounted a spherically shaped member 21, its bore being such that it engages the squared or other polygonally shaped end of the wrist pin to prevent its turning thereon, and bolted in embracing relation to this spherically-shaped member in conventional manner is the adjacent correspondingly recessed end of the connecting rod 10 and its associated bearing half 22, whereby a ball and socket connection also is produced between the connecting rod and the piston.

In conventional manner wrist pin 17 is locked against endwise movement through the bosses 15, 16 by a fastener 23 which extends through one of the bosses and the wrist pin as shown in Figure 1.

The advantages of a construction as just described and as shown in the drawings are apparent: If for any reason the crank shaft is out of true right angular relation with the cylinder in which the piston operates, which condition ordinarily would cause the piston to tilt between the cylinder walls with consequent loss of compression, leakage of gasoline, pumping of oil and the rapid accumulation of carbon as well as binding of the piston against the cylinder walls with consequent excessive friction, wear and strain on the parts, the ball and socket joints will permit self alignment of the bearings and all harmful results of such a condition will be eliminated. Furthermore, due to the ball and socket joints at each end of the connecting rod all forces transmitted from the crank shaft through the rod to the piston and from the piston through the rod to the crank shaft are concentrated substantially in a direct line through the centers of the wrist and crank pins, so that all harmful stresses and strains on the parts also are eliminated.

I claim:—

1. In mechanism of the class described, a piston having a pair of aligned openings formed in and extending through diametrically opposite portions of the side wall thereof, respectively, one of said openings being of polygonal shape and the other being circular in cross section, the minimum diameter of said circular opening being as great as the maximum diameter of said polygonal opening, and a wrist pin including cylindrical and polygonal portions engageable in said cylindrical and polygonal openings, respectively, said wrist pin being insertable through the side of the piston into said openings.

2. In mechanism of the kind described, a piston, a wrist pin extending transversely of said piston, a portion of said wrist pin being of polygonal shape in cross section, a spherical member detachably mounted on said wrist pin and including a bore a portion at least of which in cross section corresponds to and coacts with the polygonal portion of the wrist pin to prevent turning of the member on the wrist pin, and means to secure an end of a connecting rod in embracing relation to said member thereby to provide a ball and socket joint connection between the piston and the connecting rod.

In testimony whereof I hereunto affix my signature.

LORENZ LORENZEN.